Dec. 8, 1964    D. D. ELLIOTT ETAL    3,160,754
LOGARITHMIC PULSE-RATE CIRCUIT
Filed March 23, 1961    3 Sheets-Sheet 1
Fig. 1
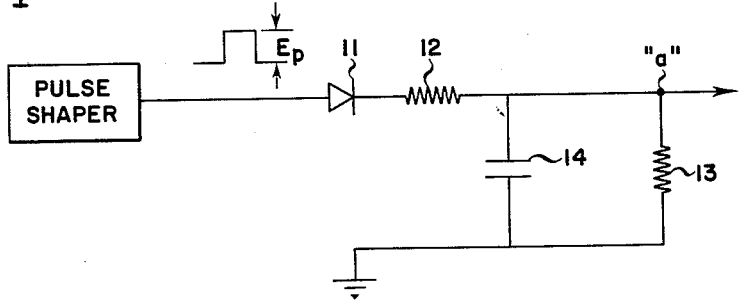
Fig. 2
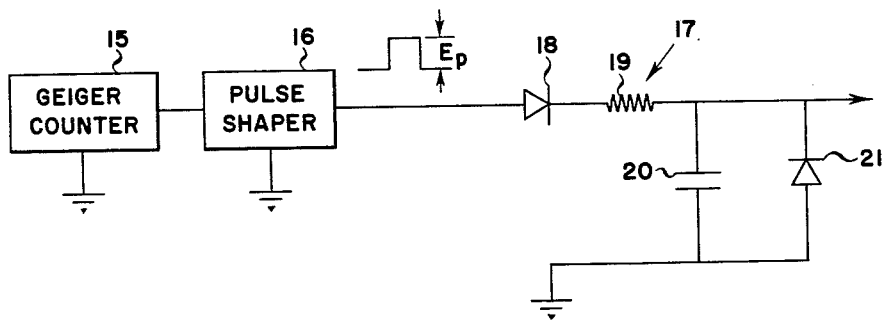
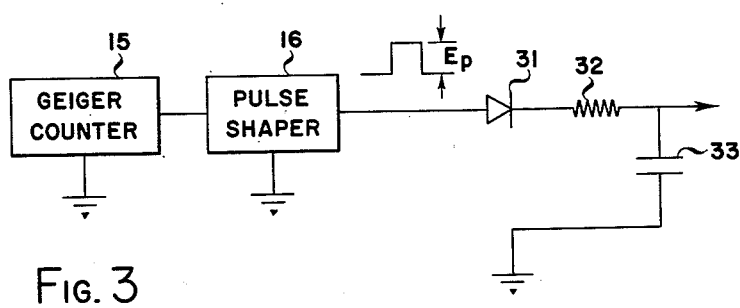
Fig. 3
*INVENTORS.*
DAVID D. ELLIOTT
FORREST S. MOZER
BY *George C. Sullivan*
Agent

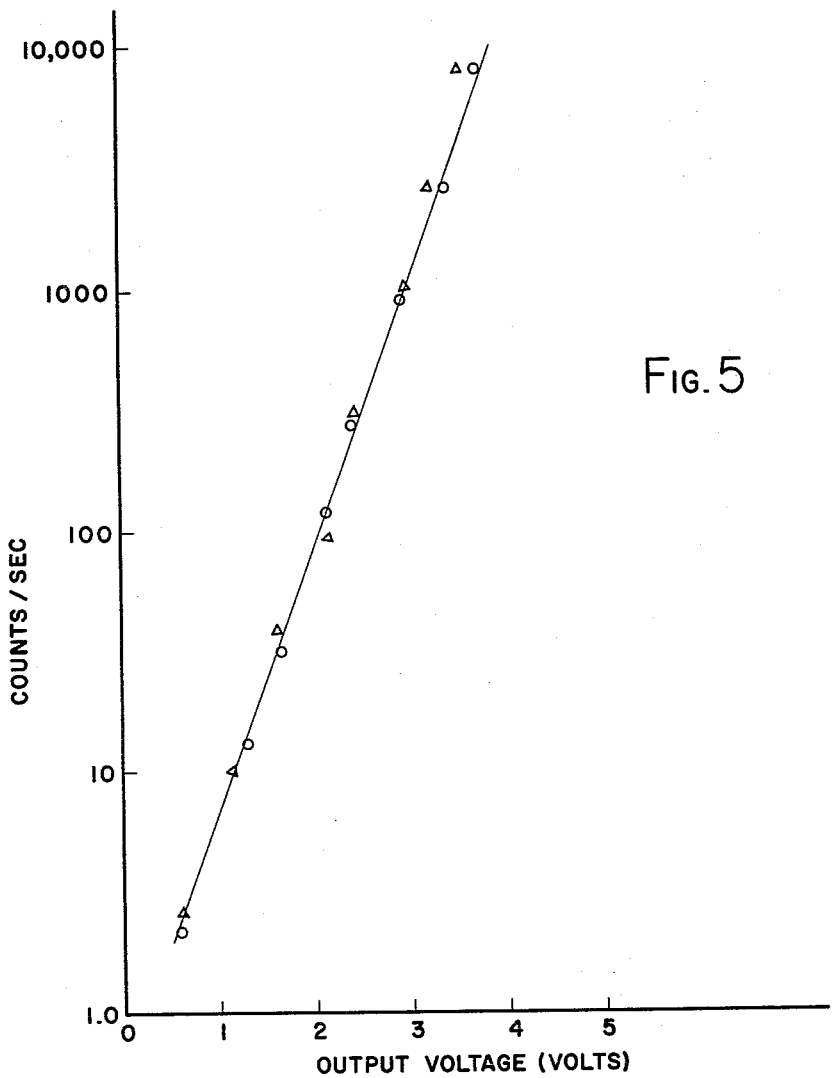

3,160,754
LOGARITHMIC PULSE-RATE CIRCUIT
David D. Elliott, Menlo Park, and Forrest S. Mozer, Brentwood, Calif., assignors to Lockheed Aircraft Corporation, Burbank, Calif.
Filed Mar. 23, 1961, Ser. No. 97,934
3 Claims. (Cl. 250—83.6)

The present invention relates to a pulse-rate counting circuit and more particularly to a pulse-rate counting circuit in which the D.C. voltage output is proportional to the logarithm of the rate of input pulses.

It is known in the art to employ pulse-rate counting devices which have a voltage output linearly proportional to the rate of pulses received by the circuit. However, in linear circuits of this type it is not possible to measure counting rates over a broad dynamic range. Devices are also known for providing D.C. voltage outputs which are proportional to the logarithm of the rate of input pulses. However, these devices are relatively complex and the logarithmic response is only approximate.

The present invention obviates the disadvantages of these prior pulse-rate counting devices by providing an extremely simple device the voltage output of which is logarithmically proportional to the pulse-rate. This is accomplished by charging a capacitor with consecutive pulses to be counted and discharging the capacitor through a backward zener diode the back current of which increases exponentially with linear increase of the back voltage. A state of equilibrium is reached when the capacitor charging rate is equal to the capacitor discharging rate, and since the diode permits current flow as an exponential function of voltage, the equilibrium voltage on the capacitor is proportional to the logarithm of the pulse rate.

Accordingly, it is an object of the present invention to provide a simple pulse-rate counting circuit capable of providing a D.C. output voltage which is proportional to the logarithm of the rate of input pulses.

Another object of this invention is to provide a pulse-rate counting circuit which employs a zener diode having a back current which increases exponentially with the linear increase of the back voltage.

A further object of this invention is to provide a pulse-rate counting circuit employing a zener diode the back current of which increases exponentially with linear increase of the back voltage wherein a capacitor is charged by the pulses to be counted and discharges in the reverse direction through the zener diode.

A still further object is to provide a device for counting the output pulse-rate of a geiger counter by charging a capacitor with the output pulses of the geiger counter and discharging the capacitor through the back impedance of a zener diode having a back current which increases exponentially with the pulse-rate.

The specific nature of the invention, as well as other objects, uses and advantages thereof, will clearly appear from the following description and from the accompanying drawings in which:

FIGURE 1 is a schematic illustration of a conventional linear pulse-rate counting circuit.

FIGURE 2 is a schematic illustration of one embodiment of the present invention.

FIGURE 3 is a schematic illustration of another embodiment of the present invention.

FIGURE 5 is a graph illustrating the theoretical and experimental results obtained by both embodiments of the present invention.

Figure 4:
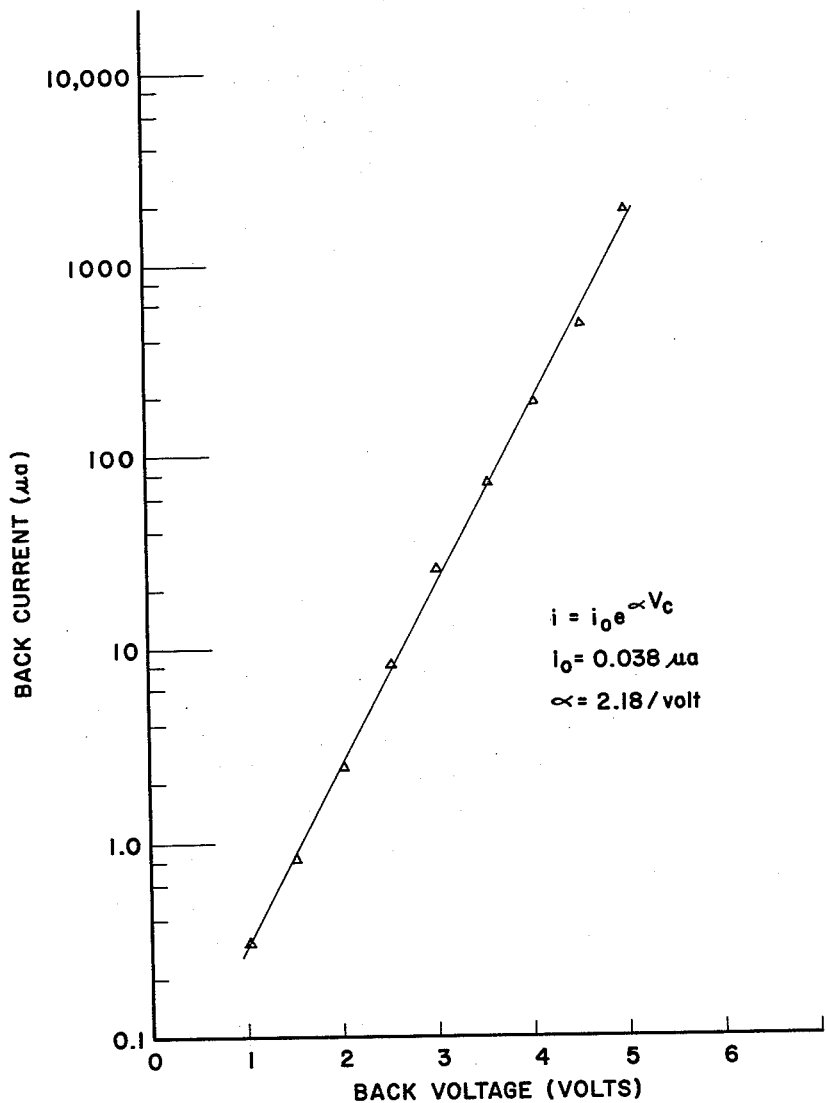
FIGURE 4 is a graph illustrating the characteristics of a zener diode employed in both embodiments of the present invention.

In FIGURE 1 is schematically illustrated a conventional pulse-rate counting circuit having silicon diode 11, resistors 12 and 13 and capacitor 14. Diode 11 has a low forward impedance and a high backward impedance and the resistance of resistor 13 is much greater than that of resistor 12. During the application of rectangular pulses the capacitor charging current ($i_{in}$) may be defined by the equation $$(1) \qquad i_{in} = n[(E_p - E_c)C]\frac{T}{R_1 C}$$

where $n$ is the pulse rate, $E_p$ is the voltage of the rectangular pulse applied to the circuit, $E_c$ is the equilibrium voltage on the capacitor, $C$ is the capacitance of the capacitor, $T$ is the duration of the applied pulse and $R_1$ is the resistance of resistor 12.

The capacitor charging time constant is selected to be large, that is $T/R_1 C \ll 1$, and $E_p$ is chosen such that $E_c \ll E_p$ and Equation 1 may therefore be rewritten as $$(2) \qquad i_{in} = \frac{E_p}{R_1}(nT)$$

Since the backward impedance of diode 11 is large, the capacitor discharge current ($i_{out}$) may be defined as $$(3) \qquad i_{out} = \frac{E_c}{R_2}$$

where $R_2$ is the resistance of resistor 13.

At equilibrium the current out equals the current in and Equation 2 may therefore be set equal to Equation 3 wherein $$(4) \qquad \frac{E_p}{R_1}(nT)\frac{E_c}{R_2}$$

and $$(5) \qquad E_c = \left[\frac{R_2}{R_1}(E_p)T\right]n = Kn$$

From Equation 5 it can be therefore seen that the equilibrium output voltage (point "a" of FIGURE 1) is linearly proportional to the count-rate.

As previously indicated, a linear relationship is unsatisfactory when it is necessary to obtain a large dynamic range of pulse-rates. The present invention has made it possible to obtain a large dynamic range by discharging a capacitor through a backward zener diode having an exponential characteristic.

In FIGURE 2 is schematically illustrated one embodiment of the pulse-rate counting circuit of the present invention. Geiger counter 15 has an output pulse rate proportional to the number of charged particles received. Since the amplitude of the geiger counter output signal varies as a function of count-rate, the signal is applied to a conventional pulse-shaper 16 which provides constant amplitude and duration pulses and a pulse-rate equal to the geiger counter pulse rate. The output of pulse shaper 16 is applied to the input of logarithmic pulse-rate counting circuit 17 including silicon diode 18 having a low forward and a high backward impedance, resistor 19, capacitor 20 and zener diode 21.

In FIGURE 3 is schematically illustrated a modification of the FIGURE 2 embodiment. In this embodiment the output of pulse shaper 16 is applied in series with zener diode 31, resistor 32 and capacitor 33. The discharge path of capacitor 20 of the FIGURE 2 embodiment is through zener diode 21 to ground whereas the discharge path of capacitor 33 of the FIGURE 3 embodiment is through resistor 32, zener diode 31, pulse shaper 16 to ground. As will hereinafter become more apparent, the FIGURE 2 embodiment provides a more accurate logarithmic pulse-rate versus output voltage relationship than does the FIGURE 3 embodiment; however, the FIGURE 3 embodiment provides an extremely simple circuit without great expense of the desired accuracy in the pulse-rate ranges generally encountered.

The following analysis is presented to more clearly describe the critical parameters and the operation of the embodiments shown in FIGURES 2 and 3. In these embodiments the values of resistance, capacitance, pulse duration and amplitude, and back impedance and zener breakdown voltage of the zener diode are chosen so that (1) the charge deposited by each pulse increases the capacitor voltage by a small amount compared to $E_c$ (in this manner noise is reduced since the voltage step is small), (2) the resistance is sufficiently large so the input circuit (pulse shaper 16) is not overloaded and sufficiently small so that $E_c$ is compatible with the equipment to which the signal is applied, (3) in the FIGURE 3 embodiment the value of resistance must be small as compared with the back impedance of the zener diode, (4) the pulse amplitude $E_p$ is much larger than $E_c$, (5) the pulse duration, T, must be less than $1/n_{max.}$ where $n_{max.}$ is the maximum counting rate that is detected, and (6) the input impedance of the equipment to which the signal is applied must be large compared to the back impedance of the zener diode to prevent shunting thereof.

With these parameters the following conditions must be realized:

$$\frac{T}{RC} \ll 1$$

and $$nT \ll 1$$

and $$E_c \ll E_p$$

The most critical feature of the present invention is that the zener diode is selected to have a back current ($i$) that increases exponentially with linear increase of back voltage which may be defined by the relation (6) $\quad i = i_0 e^{\alpha E_c}$ where $i_0$ is the current characteristic of the diode, $\alpha$ is the proportionally constant of the diode and $E_c$ is the back voltage on the diode which in this instance is also the equilibrium voltage on the capacitor. In FIGURE 4 the plot of Equation 6 is indicated by the solid line. A zener diode having the characteristic $i_0 = 0.038 \times 10^{-6}$ amps. and $\alpha = 2.18$ per volt has been found to provide an exponentially increasing back current with linearly increasing back voltage in the regions indicated by the plotted points in FIGURE 4. It should be noted that the breakdown voltage of the zener diode plotted in FIGURE 4 is at about 5 volts and the exponential characteristics are not realized at voltages less than about .3 volt.

In the embodiments shown in FIGURES 2 and 3 and under the conditions set forth above the current charging the capacitor is that defined in Equation 2 and the current discharged from the capacitor through the zener diode may be defined by the relation (7) $\quad i_{out} = i_0 e^{\alpha E_c}$ at equilibrium (8) $\quad \frac{E_p}{R_3} nt = i_0 e^{\alpha E_c}$ where $R_3$ is the resistance of resistors 19 and 32 of FIGURES 2 and 3, respectively, and (9) $\quad E_c = \frac{1}{\alpha}\left[\log \frac{E_p T}{R_3 i_0} + \log n\right]$ and Equation 9 may be rewritten

(10) $\quad E_c = K_1[K_2 + \log n]$ where $K_1$ and $K_2$ are constants independent of the pulse rate $n$. Therefore, voltage $E_c$ is dependent only on the count rate and provides an accurate measure of the logarithm thereof.

Where the value $nT$ does not satisfy the condition $nT \ll 1$, then for the embodiment in FIGURE 3 Equation 9 must be replaced by

(11) $\quad E_c = \frac{1}{\alpha}\left[\log \frac{E_p T}{R_3 i_0} + \log n - \log(1-nT)\right]$ since

(12) $\quad i_{out} = i_0 e^{\alpha E_c}(1-nT)$

Equation 11 may be written approximately as

(13) $\quad E_c = K_1[K_2 + \log n + nT]$

From Equation 13 it can be seen that a linear term is introduced into the voltage output ($E_c$). However, it has been found that the influence of this linear factor is very small at count rates frequently encountered.

Equation 10 is generally applicable to both embodiments, and only in the case where $nT$ is not much less than one does Equation 13 apply to the embodiment in FIGURE 3. In the FIGURE 3 embodiment it is necessary that the linear influence of resistor 32 and the impedance of pulse shaper 16 are low compared to the back impedance of zener diode 31. With this assumption, Equation 7 is an accurate definition of the current discharged from capacitor 33 which is verified by the experimental results set forth in FIGURE 5. In FIGURE 5 the solid line represents a plot of Equation 10, the points denoted by circles are the results of operation of the FIGURE 2 embodiment and the points denoted by triangles are the results of operation of the FIGURE 3 embodiment. It can be seen that the FIGURE 2 embodiment closely follows the theoretical curve and the FIGURE 3 embodiment closely follows the theoretical curve up to pulse rates of about 1,000 pulses per second and then starts to deviate therefrom.

The following is a tabulation of parameters of the embodiments shown in FIGURES 2 and 3. It is to be understood that these parameters are only exemplary and may be departed from within the scope as hereinabove described.

*Figure 2 Embodiment*

| | |
|---|---|
| Resistor 17 | 2000 ohms. |
| Capacitor 20 | 2.2 microfarads. |
| Duration of pulse | 1–10 microseconds. |
| Amplitude of pulse | 20–25 volts. |

*Figure 3 Embodiment*

| | |
|---|---|
| Resistor 32 | 500 ohms. |
| Capacitor 33 | 2.2 microfarads. |
| Duration of pulse | 1–10 microseconds. |
| Amplitude of pulse | 20–25 volts. |

It is to be understood in connection with this invention that the embodiments shown are only exemplary, and that various modifications can be made in construction and arrangement within the scope of the invention as defined in the appended claims.

What is claimed is:

1. The combination of a geiger counter the output of which is operatively connected to the input of a pulse shaper the output of which provides a pulse of constant amplitude and duration at a rate equal to the pulse-rate of said geiger counter, the output of said pulse shaper connected to one side of a capacitor, the other side of said capacitor connected to ground, a zener diode having a cathode to anode dynamic impedance that decreases exponentially with linear increase of cathode to anode voltage, the cathode of said zener diode connected to said one side of said capacitor, the anode of said zener diode connected to ground, whereby the voltage of said one side of said capacitor is proportional to the logarithm of the pulse-rate of said geiger counter.

2. A device for indicating the pulse-rate of an electrical pulse producing device comprising a silicon diode having low forward and high backward impedance, the anode of said silicon diode connected to said electrical pulse producing device, the cathode of said silicon diode connected to one side of a resistor, the other side of said resistor connected to one side of a capacitor and to the cathode of a zener diode having a cathode to anode dynamic impedance that decreases exponentially with linear increase of cathode to anode voltage, the other side of said capacitor and the anode of said zener diode connected to ground whereby the voltage at said one side of said capacitor is proportional to the pulse-rate of said electrical pulse producing device.

3. A device for indicating the pulse-rate of an electrical pulse producing device comprising a zener diode having a low forward impedance and a backward dynamic impedance that decreases exponentially with linear increase of backward voltage, the anode of said zener diode connected to said electrical pulse producing device, the cathode of said zener diode connected to one side of a resistor, the other side of said resistor connected to one side of a capacitor, the other side of said capacitor connected to ground, whereby said capacitor is charged through said zener diode during the time a pulse is applied and discharges through the backward impedance of said zener diode between pulses and having a voltage at said one side of said capacitor that is proportional to the logarithm of the pulse-rate of said electrical pulse producing device.

References Cited by the Examiner
UNITED STATES PATENTS

| | | | |
|---|---|---|---|
| 2,938,123 | 5/60 | Constable | 250—83.6 |
| 2,993,995 | 7/61 | Pinckaers | 250—83.6 |
| 3,015,031 | 12/61 | Dilworth et al. | |
| 3,056,047 | 9/62 | Cooke-Yarborough | 250—83.6 X |

RALPH G. NILSON, *Primary Examiner.*

ARCHIE R. BORCHELT, *Examiner.*